Patented Mar. 14, 1939

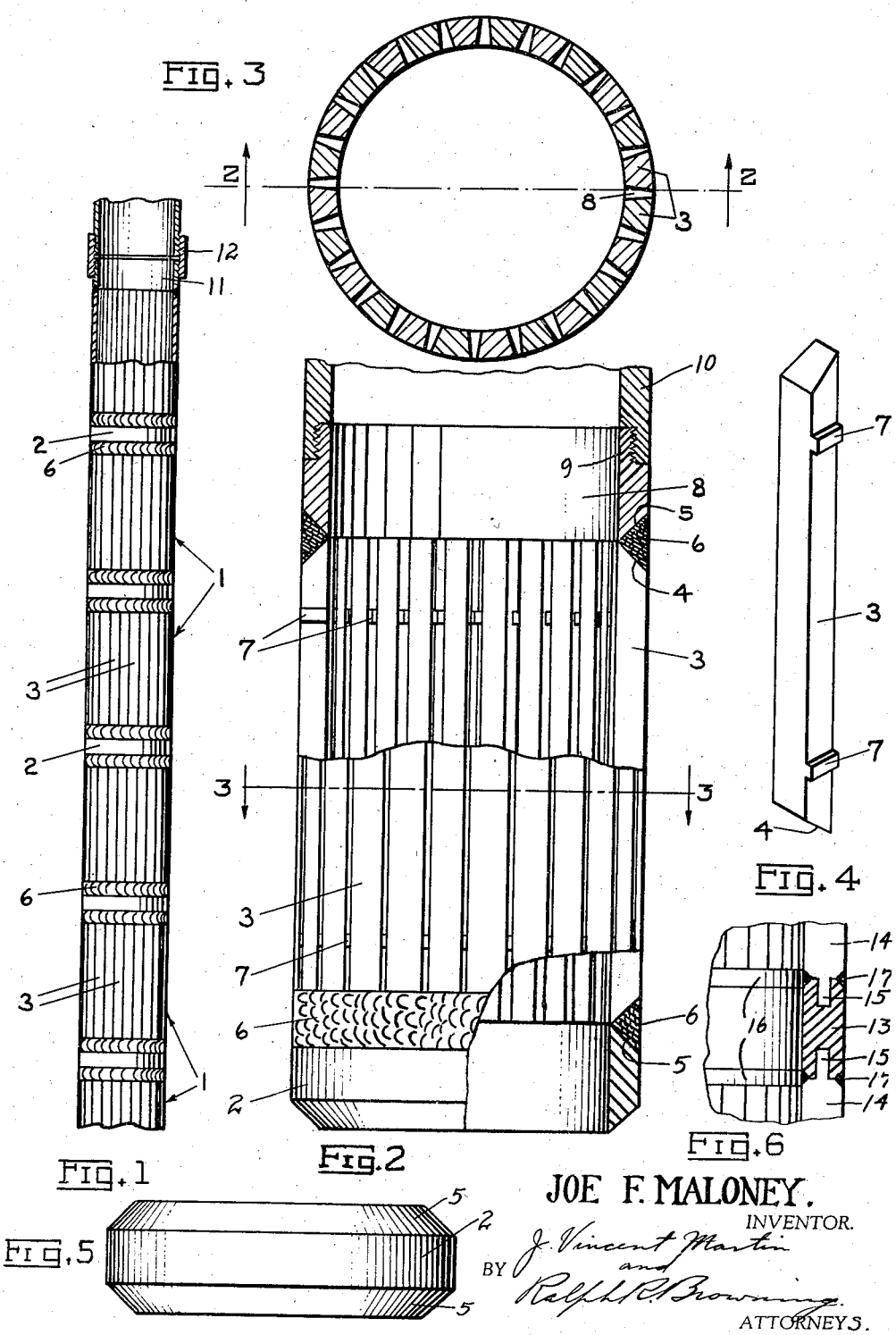

2,150,450

UNITED STATES PATENT OFFICE 2,150,450

SCREEN PIPE

Joe F. Maloney, Houston, Tex.

Application June 27, 1936, Serial No. 87,722

7 Claims. (Cl. 166—5)

This invention relates in general to screen pipe, and more particularly to that type of screen pipe adapted to be used at the bottom of oil wells or the like to prevent sand and other debris in the formation from entering the well.

Various types of screens for the purpose stated have heretofore been designed, but these have for the most part consisted of a skeleton or frame work upon which has been wound or otherwise secured wire or the like forming the actual screen. The purpose of constructing the screens in the manner just referred to is to provide a strong and rigid base frame work capable of withstanding the stresses and loads which are many times placed upon screen pipe of this character, and to cover this frame work with a structure which provides the screen proper but which is not self-supporting. The openings through the frame work within the screen proper have not been sufficiently small to themselves serve the purpose of the screen.

In the type of screen just referred to, difficulty has been experienced due to the fact that the screen proper lies outside of the supporting frame work and projects therefrom, the result being that it is not infrequently damaged during the time it is being lowered and placed in the well. Furthermore, the screen referred to has been expensive to construct and the size of the openings through the screen has been difficult to predetermine. Also, the fact that the screen proper is wrapped about a framework renders the screen inoperative except where it overlies openings in the framework, and at other points pockets are formed between the screen and the framework which serve as traps for sand and other foreign material.

It is an object of this invention to provide a screen pipe which will be of unitary construction and which will have no projecting parts on its outer contour.

It is an object to provide a screen in which the entire area of all the screen openings will be available for the passage of fluid and no pockets will be present to trap sand and other foreign matter.

It is a further object to eliminate the wrapping or other form of outer screen which has been in the past necessary in constructing well screens.

It is a further object of this invention to provide a structure in which the openings through the screen may be accurately predetermined, and in which they may be made of any size desired, including extremely small openings.

It is a further object to provide a structure of this type which will have a strength approaching that of a solid section of pipe of the same diameter and wall thickness as the screen.

With the above and other objects in view, reference is now had to the accompanying drawing, and to the following description, in which like numerals indicate corresponding parts throughout. It is to be understood that this drawing and description are by way of illustration and example and are not to be taken as in any way a limitation upon the scope of this invention. Such limitation is to be only by the prior art, and by the terms of the appended claims.

In the drawing:

Fig. 1 is a side elevation of a section of screen pipe constructed in accordance with this invention.

Fig. 2 is a view illustrating a portion of the pipe shown in Fig. 1 with parts broken away and shown in section, and with certain parts such as the openings through the screen shown in greatly enlarged proportions for purposes of illustration.

Fig. 3 is a horizontal section taken along the line 3—3 of Fig. 2.

Fig. 4 is a perspective view illustrating one of the bars forming a part of the composite screen illustrated.

Fig. 5 is a side elevation of one of the rings to which the bars are joined.

Fig. 6 is a fragmental view showing a modification.

Referring now more in detail to the drawing, the screen illustrated in Fig. 1 is made up of a plurality of zones or sections 1 between which are interposed substantially solid rings 2. The sections 1 consist each of a plurality of bars 3 arranged in parallel relation with respect to each other and assembled to form a substantially cylindrical section as illustrated in Fig. 3. These bars are preferably beveled at their ends 4, and these ends are adapted to lie adjacent the beveled ends 5 of the rings 2. A sufficient number of bars 3 are provided to form a substantially cylindrical structure of the same outer diameter as the rings 2, and the ends of these bars are welded to the adjacent ends of the rings 2 by means such as the weld metal placed in the grooves formed by the beveled ends 4 and 5.

Each of the bars 3 is of segmental cross section and is provided on one of its lateral faces with lugs 7, these lugs being of such size as to space the bars 3 apart by exactly the distance required. The bars are of substantially the same radial extent as the rings 2 so that when the screen is assembled as illustrated in Figs. 1 and 2, both the inner and outer surfaces of the screen will be substantially flush and free from any projecting portions which might be damaged by or interfere with the lowering of the screen into a well.

The uppermost screen section 3 may be welded to a ring 8, having its lower end formed with a bevel 5 similar to the ends of the ring 2, and having its upper end formed with a reduced externally threaded part 9 adapted to receive the lower end of a section of liner 10 and form a flush joint therewith, as shown in Fig. 2. Instead of this construction, however, the upper ring may be of the form shown at 11 in Fig. 1, having its outer surface simply threaded to receive an ordinary coupling 12, into which the liner is screwed. In either instance, it is noted that no part of the screen is of greater diameter than the greatest diameter of the liner.

It is further noted that the structure just described may be made in any desired number of sections 1, and that when completed it will provide a unitary and at the same time a very strong and durable screen pipe. In fact, such a pipe will possess a strength and durability approaching that of a section of solid pipe having corresponding dimensions.

The openings between the bars 3 may be very accurately controlled by means of controlling the size of the lugs 7, and in order to emphasize the importance of this point it is noted that these openings in the ordinary screen pipe may be very narrow, sometimes less than ten thousandths of an inch in width at the outer surface of the screen. For this reason, it is desirable tht the length of the bars and of the sections 1 be sufficiently short that the intermediate portions of the bars will not become bent and cause some of the openings to be wider than desired. In order to possess the required rigidity for the most common sizes of screen pipe, these sections 1 should be not longer than three times the diameter of the pipe. It will be understood, however, that this invention is not necessarily limited to this ratio of section length to diameter.

In Fig. 6 is shown a modified form of joint for use between the rings and bars. In this form, the rings 13 are formed with grooves in their opposite ends and the bars 14 are formed with tongues 15 adapted to fit thereinto. This construction serves to positively position the ends of the bars with respect to the rings and insures proper alignment of these parts. In this construction also, the joints may be welded inside at 16 as well as outside at 17. It is noted that in this form both the inside and outside surfaces of the rings will be flush with the corresponding bars, thus forming a screen structure flush on both the inside and the outside, the same as in the previously described form.

From the foregoing it will be seen that a structure has been set forth which is capable of accomplishing all of the objects sought by this invention.

Having described my invention, I claim:

1. A well screen comprising a plurality of spaced axially aligned rings externally beveled at their ends, a plurality of parallel segmental bars having externally beveled ends, said bars being arranged in the form of a cylinder and interposed between adjacent ends of adjacent rings, said bars being of a length not greater than three times the diameter of said rings, a lug on one side of each of said bars adjacent each end thereof to space it from the next adjacent bar by a predetermined amount, and weld metal filling the spaces betwen the adjacent beveled ends of said rings and bars to integrally join said parts together and form a unitary screen structure.

2. A well screen comprising a plurality of spaced axially aligned annular rings externally beveled at their ends, a plurality of parallel segmental bars having externally beveled ends, said bars being arranged in the form of a cylinder and interposed between adjacent ends of adjacent rings, means interposed between adjacent bars to space them apart by a predetermined amount, and weld metal filling the spaces between the adjacent beveled ends of said rings and bars to integrally join said parts together and form a unitary screen structure.

3. A well screen comprising a plurality of spaced axially aligned annular rings, a plurality of parallel segmental bars, said bars being arranged in the form of a cylinder and interposed between adjacent ends of adjacent rings, and having their outer surfaces in alignment with the outer surfaces of said rings, means interposed between adjacent bars to space them apart by a predetermined amount, and means integrally joining the adjacent ends of said bars and said rings to form a unitary screen structure of uniform outer diameter.

4. A well screen comprising a unitary cylindrical structure of uniform inner and outer diameter and consisting of alternating imperforate zones and zones made up of longitudinally arranged laterally spaced bars, and a well liner of the same outer diameter as said screen and coupled thereto with an internally and externally flush joint.

5. A well screen comprising a plurality of spaced axially aligned annular rings, a plurality of bars arranged to form a cylinder and interposed between adjacent ends of adjacent rings and having their inner and outer surfaces in alignment with the inner and outer surfaces of said rings, the ends of said bars and rings having cooperating interfitting parts to properly align said bars and rings with respect to each other, and means securing said bars and rings together.

6. A well screen comprising a plurality of spaced axially aligned annular rings, a plurality of bars arranged to form a cylinder and interposed between adjacent ends of adjacent rings, and having their outer surfaces in alignment with the outer surfaces of said rings, the ends of said bars and rings having cooperating tongues and grooves to properly align said bars and rings with respect to each other, and means securing said bars and rings together.

7. A well screen comprising a plurality of spaced axially aligned annular rings, a plurality of bars arranged to form a cylinder and interposed between adjacent ends of adjacent rings and having their outer surfaces in alignment with the outer surfaces of said rings, the ends of said bars and rings having cooperating tongues and grooves to properly align said bars and rings with respect to each other, said bars and rings being beveled along their lines of juncture to form grooves therebetween, and bonding material substantially filling said grooves to secure said rings and bars together with flush joints.

JOE F. MALONEY.